United States Patent Office 3,076,800
Patented Feb. 5, 1963

3,076,800
β-LACTAMS UNSUBSTITUTED AT THE NITROGEN ATOM AND PROCESS FOR MAKING THEM
Roderich Graf, Frankfurt am Main, Germany, assignor to Farbwerke Hoechst Aktiengesellschaft vormals Meister Lucius & Brüning, Frankfurt am Main, Germany, a corporation of Germany
No Drawing. Filed June 22, 1960, Ser. No. 37,834
Claims priority, application Germany Mar. 22, 1958
13 Claims. (Cl. 260—239)

The present invention relates to β-lactams unsubstituted at the nitrogen atom and to a process for making them.

It is known that salts of β-amino-(N-sulfonic acid)-carboxylic acids are obtained by hydrolyzing β-lactam-N-sulfochlorides with a lye

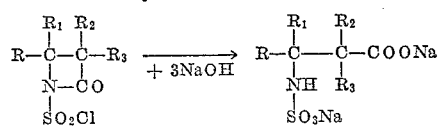

It is also known that β-hydroxy carboxylic acid amides are obtained by hydrolyzing β-lactam sulfochlorides by heating them in an aqueous solution without the mineral acid set free being neutralized at the same time

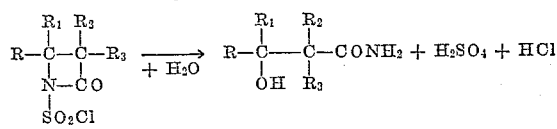

I have now found that β-lactams unsubstituted at the nitrogen atom of the general formula (I)

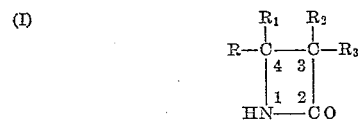

wherein R represents a hydrocarbon radical and the substituents $R_1$, $R_2$, and $R_3$ each represent a hydrocarbon radical or a hydrogen atom, can be obtained by hydrolyzing the corresponding β-lactam N-sulfochlorides within a pH range of between 1 and 12, advantageously at a pH of 2 to 10, at a temperature within the range of 0° C. and 60° C., preferably 20° C. and 60° C., and with the use of an acid-binding agent and, if desired, in the presence of a dissolving intermediary, so as to obtain the free β-lactams, for example, according to the following reaction equation:

(II)

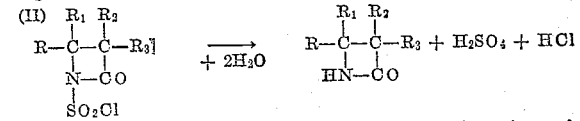

The above β-lactams which are unsubstituted at the nitrogen atom but carry at least one hydrocarbon radical as substituent at the $C_4$-carbon atom have not previously been described. Furthermore, those β-lactams cannot be prepared by the process known for making β-lactams.

In the above formulae, the substituents R, $R_1$, $R_2$, and $R_3$ have preferably the following meanings:

R represents a saturated alkyl radical containing from 1 to about 10 carbon atoms, preferably 1 to 6 carbon atoms, which may be branched, or represents an aromatic hydrocarbon radical, especially a phenyl group, which may be further substituted by alkyl or alkoxy groups of low molecular weight which advantageously contain from 1 to 3 carbon atoms, halogen atoms, a nitro group, or a nitro group and a halogen atom; the group

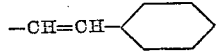

or a lower alkyl group substituted by an esterified carboxylic group, for example the radical $$-CH_2-COO-C_nH_{2n+1}$$

wherein n stands for a whole number of 1–20. The substituents $R_1$, $R_2$ and $R_3$ may stand for a hydrogen atom or a saturated alkyl group containing from 1 to about 10 carbon atoms, advantageously 1 to 6 carbon atoms, which may be branched, with the understanding that when R represents an aromatic radical the substituents $R_1$, $R_2$ and $R_3$ represent hydrogen atoms, and when R represents an aliphatic radical $R_1$ likewise represents an alkyl radical. Furthermore, two of any of the radicals R, $R_1$, $R_2$ and $R_3$ may be connected together to form a cycloaliphatic ring containing from 5 to 8 carbon atoms, especially 6 carbon atoms. Still further the grouping

may twice appear in the same molecule of the β-lactam-N-sulfochloride used as starting material so that the final product contains two lactam rings

In this case, the substituent R may stand, for example, for a radical having the following constitution:

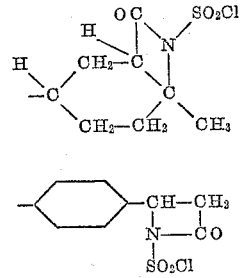

or

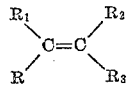

When this meaning of R is applied to Formula I above, a hydrogen atom is substituted for the group —$SO_2Cl$.

The β-lactam-N-sulfochlorides used as starting material may be obtained, for example, by reacting an olefin having the general structure

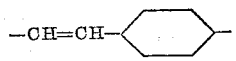

with N-carbonyl sulfamidic acid chloride. If R represents an aromatic radical, $R_1$, $R_2$, and $R_3$ must represent hydrogen as mentioned above, and if R stands for an aliphatic radical, $R_1$ must also represent an aliphatic radical to ensure that the reaction of the olefins with N-carbonyl sulfamidic acid chloride leads to the desired β-lactam-N-sulfochlorides.

The β-lactam-N-sulfochloride having the constitution of Formula I above, in which R stands for an aromatic radical which may be substituted or represents the radical $$-CH=CH-\langle\bigcirc\rangle$$

may be prepared from aromatic aldehydes via the intermediary products which are obtained according to the following scheme of reaction

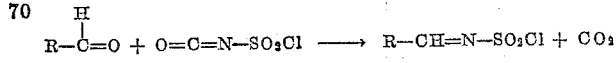

and then reacting the intermediary product with carbomethylene:

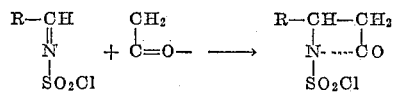

The reaction according to this invention is advantageously carried out by introducing the lactam sulfochloride in portions or continuously, while stirring, into water or into a part of a hydrolyzing mixture obtained from a previous batch, and continuously binding the hydrochloric acid and sulfuric acid set free by the addition of an acid-binding substance. It is advantageous to initially admix the reaction mixture with a suitable buffer salt, for example sodium acetate or sodium citrate or disodium phosphate, in a proportion of about 0.02 mol to 0.1 mol of salt per mol of lactam sulfochloride, and then to add, in the course of the reaction, the acid-binding agent while continuously controlling the pH value and cooling the reaction mixture so that the reaction temperature does not exceed 50° C.

In those cases in which the hydrolysis in an aqueous medium takes place at a velocity too small for practical purposes, the reaction mixture may advantageously be admixed with a small amount of a water-soluble inorganic iodide, especially an alkali metal iodide. The iodide added, i.e. sodium or potassium iodide, which has a catalytic redox effect, increases the velocity of hydrolysis by 100 to 10,000 times and favors the formation of free lactams. The iodides are generally used in a catalytic proportion of about 0.001 to 0.1 mol, advantageously 0.005 to 0.01 mol of iodide per mol of lactam sulfochloride.

Especially in that case where the β-lactams obtained as end products are difficultly soluble in water, the reaction may be carried out instead of in the purely aqueous phase in a hydrous alcohol of low molecular weight. As alcohols there may be used more especially those which contain from 1 to 4 carbon atoms, such as methanol, ethanol, propanol, isopropanol or any desired mixture thereof in any desired ratio. The proportion of alcohol in the mixture of alcohol and water may amount to up to 95% by volume.

As acid-binding agents it is especially advantageous to use alkali metal hydroxides or alkaline earth metal hydroxides, carbonates or bicarbonates, especially the corresponding potassium and sodium compounds. Organic, especially tertiary bases, such as trimethylamine, triethylamine or pyridine, may, however, also be used.

The hydrolysis carried out in order to obtain the free lactam proceeds especially smoothly when 4,4-dimethyl-acetidinone-(2)-N-sulfochloride obtainable from isobutylene and N-carbonyl sulfamidic acid chloride, is used as starting material. But even in this case, it is found that the hydrolysis leading to the β-lactam takes place substantially more rapidly than initially, where almost pure water is used as the hydrolyzing agent, when—for example with the use of sodium hydroxide solution or sodium carbonate as acid-binding agent—sodium chloride and sodium sulfate have formed in a sufficient concentration, so that conditions are created in the aqueous solution under which the 4,4-dimethyl-acetidinone-(2) formed or a portion thereof separates as the second liquid phase. In this lactam phase, the β-lactam-N-sulfochloride to be hydrolyzed is substantially more readily soluble than in water. Since the separated lactam phase contains a considerable proportion of water, the hydrolysis of the lactam sulfochloride takes then place substantially in this layer in the homogeneous phase. The β-lactam formed during the hydrolysis of the β-lactam-N-sulfochloride has the property to act as a dissolving intermediary and, therefore, accelerates the reaction. This effect may be utilized with special advantage in carrying out the process of this invention by using instead of pure water a part of the reaction mixture obtained in a previous batch as starting material. In this case, the water and acid-binding agent to be added in the course of the hydrolysis are used in a proportion such that the salt concentration is maintained constant. In other words, the hydrolysis can in this case be carried out from the onset with a maximum velocity so that a given amount of lactam sulfochloride can be hydrolyzed within a period of time ranging from some minutes to 30 minutes provided that the reaction apparatus used permits the heat evolved to be dissipated. Instead of with β-lactam the reaction mixture may also be admixed with an appropriate organic inert solvent which acts as a dissolving intermediary, for example, dimethylformamide, methylacetamide or tetrahydrofurane. The inert organic solvents are used in admixture with water, the mixture containing up to 90% by volume of the organic solvent or a combination of different inert solvents.

In the case of β-lactam-N-sulfochlorides which contain higher alkyl radicals as substituents, for example the β-lactam-N-sulfochlorides obtainable from 2-methylpentene-(1) or diisobutylene, the hydrolysis in water alone proceeds initially so slowly at the range of temperature to be observed that it is advantageous to admix the water from the very beginning with a certain proportion, for example about 5% to 10%, of the β-lactam to be prepared. The β-lactam to be added may have been prepared in a previous batch and serves as dissolving intermediary.

In the case of β-lactam-N-sulfochloride whose lactams crystallize and are only scarcely soluble in water, for example, the β-lactam-N-sulfochlorides which are obtained from styrene or tetramethylethylene, the dissolving intermediary added may be another liquid β-lactam obtained by the process of this invention, for example, 4,4-dimethyl-acetidinone-(2) and/or more especially another substance known to be a dissolving intermediary, for example dimethylformamide, N-methylacetamide, or tetrahydrofurane.

In special cases when the hydrolysis of the β-lactam-N-sulfochlorides proceeds too slowly, the reaction mixture may also be admixed under otherwise identical conditions with a reducing agent.

As reducing agents there may be mentioned more especially: metal powders, such as zinc dust, aluminum powder, iron powder, calcium chips, or reducing salts, such as stannous chloride, titanous chloride, chromous acetate, sodium hypophosphite, sodium dithionite, sodium thiosulfate, potassium iodide or mixtures of these substances. Compounds carrying a reducing hydrogen atom, such as the hydrogen compounds of sulfur, selenium, tellurium, iodine and, furthermore, compounds, such as mercaptanes and thiophenols, may also be used.

When a reducing substance is used, it is advantageous to work at a pH value within the range of 1 to about 6; the reaction is carried out in a manner such that the β-lactam-N-sulfochloride is dissolved or suspended, for example, in water or a dilute alcohol, and the reducing agent is added while cooling and stirring. Alternatively, the reaction may be carried out in a manner analogous to that described for the variant without reducing agent by first introducing the whole amount of reducing agent required, either dissolved or suspended in the reduction medium, into the reaction apparatus and then slowly adding the β-lactam-N-sulfochloride in portions or continuously.

In the redox hydrolysis of β-lactam-N-sulfochlorides, it may sometimes be advantageous to use during the manufacturing process of the lactams a two-phase liquid reaction medium, one phase of which is water while the second phase is an inert organic solvent that is immiscible or scarcely miscible with water. As inert organic solvents there may be used, for example: chlorinated aliphatic hydrocarbons containing from 1 to 3 carbon atoms and from 1 to 4 chlorine atoms and boiling at a temperature below 100° C., for example, methylene chloride, chloroform, carbon tetrachloride, dichloroethane, monochloropropane and also butanol or acetic acid ester. In the two-phase mixture the ratio of the two phases to one another should amount to about 10:1 to 1:10 parts by weight. In this working method the good solubility of starting material and end product in the organic phase promotes the reaction of the β-lactam-N-sulfochlorides and also promotes the isolation of the β-lactams after the reaction has been terminated. Furthermore, it is often advantageous to use the β-lactam-N-sulfochlorides immediately in the form of a solution, for example, in methylene chloride.

The isolation of the β-lactams from the reaction mixture is very simple. In some cases, the β-lactams crystallize from the reaction mixture by themselves, depending on the solvent selected, or they may separate in the form of an oil which can be isolated from the solvent in a simple manner. Alternatively, a part of the salts formed during the reaction may be separated by cooling before the β-lactams are isolated from the reaction mixture by extracting them with an appropriate solvent, for example methylene chloride, diethyl ether, carbon tetrachloride, ethyl acetate or chloroform. Ethyl acetate and methylene chloride have proved especially advantageous. The solvent is removed by distillation and the β-lactams remain in the water in the form of more or less readily soluble, oily or crystalline products, which can be purified by distillation under reduced pressure or by recrystallization.

The products obtained by the process of this invention are used as intermediates for the preparation of textile assistants, medicaments, pest control agents, and plastics. The β-lactams and more especially the β-lactams which contain lower alkyl radicals, can be used with special advantage as selective solvents for acetylene. The aforesaid lactams exhibit a very good chargeability and are, therefore, of particular industrial interest for use in the separation of mixtures of ethylene with acetylene. Thus, for example, 1 N-cc. of 4,4-dimethyl-acetidinone-(2) dissolves at 20° C. per physical atmosphere 1.75±0.1 N-cc. ethylene (the ethylene volume was measured at 0° C. under a pressure of 760 mm. of mercury) and 14.0±0.1 N-cc. acetylene which, corresponds to a separating factor of 8.

1 gram of 3,4,4-trimethyl-acetidinone-(2) dissolves at 25° C. 1.9±0.1 N-cc. ethylene and 30.0±0.2 N-cc. acetylene per physical atmosphere, which corresponds to a separating factor of 15:1 for the separation of acetylene-ethylene.

The minor specific volatility of the aforesaid β-lactams taken together with the high separating factor is of special importance for the separation of mixtures of ethylene and acetylene into their components.

This application is a continuation-in-part application of my co-pending application Serial No. 800,408, filed March 19, 1959, now abandoned.

The following examples serve to illustrate the invention but they are not intended to limit it thereto:

*Example 1*

A total quantity of 395 grams (2 mols) of 4,4-dimethyl-acetidinone-(2)-N-sulfochloride was introduced in portions and at a temperature of 25° C. to 30° C., while stirring, into a solution of 14 grams of sodium acetate in 250 cc. of water, and the pH value of the reaction mixture was kept at between 4 and 6 by the simultaneous dropwise addition of 10 N-lye.

When about half of the lactam sulfochloride had been reacted in the course of 1 hour, the second half of the lactam sulfochloride was hydrolyzed substantially more rapidly and was complete within about 15 minutes while cooling was intensified. 600 cc. of 10 N-sodium hydroxide solution were needed to bind the hydrochloric acid and sulfuric acid set free. The reaction mixture was again stirred for some time at 30° C. until the mixture did no longer change its pH which had been adjusted to 7. Stirring was interrupted and the reaction mixture formed a two-phase liquid mixture, the lactam being substantially contained in the lighter and in most cases somewhat yellowish colored liquid layer. The reaction mixture was cooled to about 10° C., while stirring, and the bulk of the sodium sulfate, which had a salting out effect on the lactam, was separated as decahydrate, and the separated lactam was dissolved. The separated salt was suction-filtered and squeezed off and the lactam was removed from the aqueous salt solution by means of methylene chloride. The product was worked up and 4,4 - dimethyl - acetidinone - (2) (dimethylpropiolactam) was obtained as a colorless readily water-soluble liquid with a yield of 180 grams corresponding to about 90% of the theory. The product had a boiling point of 65° C. under a pressure of 0.2 mm. of mercury.

When instead of water a part of the two-phase liquid reaction mixture obtained from a previous batch was used as starting material, the β-lactam-N-sulfochloride was hydrolyzed at a high velocity from the very beginning. The reaction mixture was neutralized with about 7 N-sodium hydroxide solution to maintain the salt concentration constant and the reaction completed at a temperature of 25° C. within about 30 minutes or even less when a cooler of sufficient capacity was used.

*Example 2*

A total quantity of 225.5 grams (1 mol) of 4-methyl-4 - n - propyl - acetidinone - (2) - N - sulfochloride (obtained from 2-methyl-pentene-(1) and N-carbonyl-sulfamidic acid chloride) was introduced in portions and at a temperature of 30° C. to 40° C., while stirring, into a solution of 100 cc. water and 14 grams of sodium acetate, and the acid set free was bound by adding 5 N-sodium hydroxide solution dropwise, the pH being maintained at 5 to 7. After 2 hours, only about 70 cc. of the 5 N-sodium hydroxide solution were consumed. Soon thereafter, the lactam formed commenced to separate as the lighter layer and further hydrolysis took place substantially more rapidly so that in spite of intensified cooling and a reaction temperature of 25° C., the sulfochloride could be introduced more rapidly into the mixture. After a further hour, the theoretical consumption of 600 cc. of 5 N-sodium hydroxide solution was approximately reached.

The 4-methyl-4-n-propyl-acetidinone-(2) which had only a limited solubility in water was extracted from the reaction mixture by means of methylene chloride. The solvent was eliminated by distillation and the residue was distilled at 75° C. under a pressure of 0.2 mm. of mercury. 110 grams of the product were obtained in the form of a colorless liquid which resembled glycerol.

The hydrolysis of the β-lactam-N-sulfochloride took a substantially more rapid course from the beginning when a part of the two-phase reaction mixture obtained from a previous batch was used in the place of water.

*Example 3*

25 grams of 4-phenyl-acetidinone-(2-)N-sulfochloride were introduced in portions and at temperature of 30° C. to 35° C., while stirring, into the mixture of a solution of 10 grams of anhydrous sodium sulfate in 40 cc. of water and 20 grams of 4,4-dimethyl-acetidinone-(2) (dimethylpropiolactam), and the mineral acid set free was bound by the dropwise addition of a total of 60 cc. 5 N-sodium hydroxide solution, a pH value of 8 to 10 being maintained in the reaction mixture. After about 1 hour, the splitting off of acid was complete. The whole was mixed with 50 cc. of methylene chloride and the two-phase mixture which could only be separated with difficulty due to the formation of an emulsifying by-product was suction-filtered over a layer of active carbon, and afterwashed with methylene chloride. The methylene chloride layer was then separated, the solvent was evaporated and the 4,4-dimethyl-acetidinone-(2) used as dissolving intermediary was distilled off at a bath temperature of 100° C. under a pressure of 0.2 mm. of mercury.

5 grams of 4-phenyl-acetidinone-(2) were obtained as residue. The product was recrystallized from dilute methanol and then melted at 108° C.–109° C. The mixed melting point with a comparative preparation exhibited no depression. The reaction took place in the same manner when in the above example the mixture of sodium sulfate solution and dimethylpropiolactam was replaced by a mixture of 20 cc. of dimethylformamide and 20 cc. of water, or by a mixture of 20 cc. of tetrahydrofurane and 20 cc. of water, and the mineral acid set free was bound at a pH value of 7 to 9 with 30 cc. of 10 N-sodium hydroxide solution.

*Example 4*

A mixture of 114 grams (1 mol) of 2-methyl-propene-(2)-1-carboxylic acid methyl ester

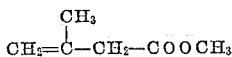

150 cc. of diethyl ether, and 142 grams (1 mol) of N-carbonyl-sulfamidic acid chloride

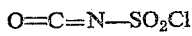

was maintained for 6 hours at a temperature of 30° C. initially by cooling and towards the end by slight heating. The homogeneous, not-crystallizing reaction mixture then contained substantially 4-methyl-4-carbomethoxymethyl-acetidinone-(2)-N-sulfochloride in addition to ether.

In order to convert the sulfochloride into the 4-methyl-4-carbomethoxymethyl-acetidinone-(2), the reaction mixture described above was introduced dropwise within 1 hour and at 20° C., while stirring permanently and cooling, into a solution of 20 grams of sodium acetate in 200 cc. of water, and the pH value of the hydrolyzing mixture was maintained at 5 to 7 by the addition of a total amount of about 300 cc. of 10 N-sodium hydroxide solution. The hydrolysis of this lactamsulfochloride took place especially smoothly without any retardation which fact is most likely the result of the slightly hydrophilic ester group.

The hydrolyzing mixture obtained on which a layer of the partially precipitated lactam floated, was inoculated with sodium sulfate decahydrate, cooled to about 10° C., and the precipitated Na$_2$SO$_4$.10H$_2$O was filtered off with suction. The filter residue was after-washed with methylene chloride and the filtrate was repeatedly extracted by shaking with methylene chloride. The combined methylene chloride extracts left, after removal of the solvent by distillation, an oily residue which distilled over at 115° C. to 116° C. under a pressure of 0.1 mm. of mercury as a colorless crystallizing oil. The yield amounted to 80 grams. The product dissolved in 150 cc. of warm carbon tetrachloride and after having been admixed with 200 cc. of ether, it yielded on cooling about 70 grams of splendid, coarse crystals of 4-methyl-4-carbomethoxymethyl-acetidinone-(2).

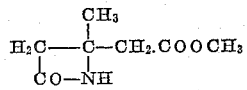

which melted at 74°–75° C. The product was readily soluble in methylene chloride, less readily soluble in carbon tetrachloride, little soluble in cold ether, and insoluble in cyclohexane.

A solution of the above compound in concentrated hydrochloric acid heated up spontaneously.

*Example 5*

A total quantity of 180 grams of 4-(2'-nitrophenyl)-acetidinone-(2)-N-sulfochloride was introduced in portions within 1 hour and at a temperature of 20° to 30° C., while stirring, into a mixture of 600 cc. of methanol, 5 grams of potassium iodide and 50 cc. of water, and the pH value of the reaction mixture was maintained at 2 to 4 by the dropwise addition of altogther about 120 cc. of 10 N-sodium hydroxide solution. After all the sulfochloride had been introduced while stirring was continued and the pH value, which had been brought to about 6 to 7, did no longer change, the reaction mixture was mixed with 800 cc. of water, and the whole was heated at a temperature near the boiling point. The mixture dissolved to give a clear liquid from which 4-(2'-nitrophenyl)-acetidinone-(2) crystallized out on cooling in the form of flat, yellowish needles.

The yield amounted to 100 grams. The product was again recrystallized from hot methanol of 50% strength and was then obtained in analytically pure form. The melting point was 152° to 153° C.

The following β-lactams were prepared in substantially the same manner with the exception that the amounts of solvent used were varied.

4-(3'-nitrophenyl)-acetidinone-(2)—light yellow leaflets, melting point: 129° C. (from hot dilute methanol)

4 - (4' - nitrophenyl) - acetidinone-(2) — yellowish flat needles, melting point: 153° to 154° C. (from hot dilute methanol)

4-(4'-chlorophenyl)acetidinone-(2) — colorless needles, melting point: 98° to 99° C. (from dilute methanol)

4-(3'-bromophenyl)-acetidinone-(2) — colorless leaflets, melting point: 101° to 102° C. (from hot dilute methanol)

4-(2',4'-dichlorophenyl)-acetidinone-(2)—long colorless needles, melting point: 139° to 140° C. (from hot methanol)

4 - (2',6' - dichlorophenyl) - acetidinone - (2) — colorless needles, melting point: 143° C. (from hot dilute methanol)

4 - (3' - methoxy - phenyl) - acetidinone - (2) — colorless needles, melting point: 67° to 68° C. (from dilute methanol by cooling)

4-(3'-nitro-4'-chlorophenyl)-acetidinone-(2)—small yellowish needles, melting point: 125°–126° C. (from hot methanol)

4-(3'-nitro-6'-chlorophenyl)-acetidinone-(2) — small yellowish needles, melting point: 139° C. (from much hot methanol)

4 - (2' - nitro - 5' - chlorophenyl) - acetidinone - (2)— small coarse crystals, melting point: 194° to 195° C. (from hot isopropanol)

4-(β-phenylethenyl)-acetidinone-(2)

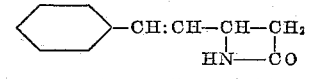

long colorless small needles, melting point: 131°–132° C. (from hot water)

1,4-phenylene-bis-(4-acetidinone-2)

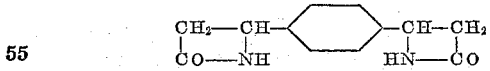

indistinctly crystalline powder of a melting point above 280° C.; only little soluble even in boiling methanol or water.

*Example 6*

A mixture of 220 grams of thiophenol and 79 grams of pyridine was run within 15 minutes at a temperature of 20° C. to 25° C., while stirring and cooling, into a mixture of 246 grams of 4-phenyl-acetidinone-(2)-N-sulfochloride and 1 liter of methanol. The reaction mixture then solidified rapidly to give a colorless crystalline magma. The whole was suction-filtered and about 180 grams of diphenyldisulfide melting at 60°–61° C. were obtained. After evaporation of the methanol, the filtrate yielded a colorless crystalline residue which was washed with cold water to remove pyridine hydrochloride. The crystalline cake was extracted with several liters of hot water, an oily proportion of diphenyldisulfide which was insoluble in hot water was separated, and about 90 grams of a crystalline substance which melted at 105°–107° C.

were obtained on cooling. The product was again recrystallized from dilute methanol and was then obtained in the form of thin colorless prisms having a melting point of 107°–109° C., of which the analytical values found correspond to a compound having the formula $C_9H_9OH$. The compound could be readily sublimed under a pressure of about 0.2 mm. of mercury and then formed fern-like, curved small needles melting at 109° C. The compound could be distilled without decomposition at a temperature of 130°–133° C. under a pressure of about 1 mm. of mercury and was readily soluble in alcohol, methylene chloride, and hot benzene, moderately soluble in hot water, and little soluble in cold water. The compound so obtained constituted the β-lactam of 2-amino-2-phenylethane-1-carboxylic acid (4-phenyl-acetidinone-(2)).

A not too strongly diluted solution of the above compound in concentrated hydrochloric acid boiled on being heated to about 60° C. while the temperature suddenly increased and separated on cooling the hydrochloride of 2-amino-2-phenylethane-1-carboxylic acid in crystalline form.

When the β-lactam sulfochloride obtainable from commercial methylstyrene (isomeric mixture of 3-methylstyrene and 4-methylstyrene) was used as starting material, a mixture of the analogous nucleus-methylated β-lactams which melted at 80–95° C. was obtained.

*Example 7*

226 grams of 3,3,4,4-tetramethyl-acetidinone-(2)-N-sulfochloride was introduced in portions at a temperature of 20°–25° C., while stirring and cooling, into a mixture of 620 grams of sodium thiosulfate, 10 grams of potassium iodide, 1 liter of methanol and 1 liter of water. Stirring of the reaction mixture was continued for some time at about 50° C., the bulk of the methanol was removed by distillation, and the precipitated sulfur was filtered off. On cooling, the major proportion of the 3,3,4,4-tetramethyl-acetidinone-(2) formed crystallized out and another proportion was obtained by extracting the solution with methylene chloride. The yield amounted to about 110 grams.

The novel compound so obtained could be readily sublimed in vacuo. It was readily soluble in the usual organic solvents and hot water, less readily soluble in cold water and had a sharp melting point of 104° C.; boiling point: 127–128° C. under a pressure of 18 mm. of mercury. The analytical results indicated a composition corresponding to a compound of the formula $C_7H_{13}ON$. A solution of the above compound in concentrated hydrochloric acid when heated at 60° C. boiled with a sudden increase in temperature and separated on cooling the hydrochloride of 2,3-dimethyl-3-amino-butane-2-carboxylic acid.

*Example 8*

395 grams of 4,4-dimethyl-acetidinone-(2)-N-sulfochloride were introduced in portions at a temperature 20–30° C., while stirring and cooling, into a mixture of 150 grams of zinc dust, 400 cc. of methanol and 250 cc. of water. Initially, it took some time until the reaction set in which then proceeded smoothly. A large amount of sulfur dioxide escaped. When the reaction was complete, the zinc dust in excess and the zinc sulfite separated were suction-filtered. The bulk of the methanol was removed from the filtrate by evaporation under reduced pressure, another proportion of precipitated zinc sulfite was removed by filtration, if desired, and the lactam contained in the solution was extracted with methylene chloride. The solvent was evaporated and the residue was distilled under a pressure of 0.8 mm. of mercury. About 150 grams of 4,4-dimethyl-acetidinone-(2) were obtained in the form of a colorless, almost odorless liquid which distilled over at a temperature of 67–68° C. The liquid so obtained was miscible with water in any desired ratio, from which it could be removed by salting out with potash but not by salting out with sodium chloride. The compound so prepared was miscible in any desired ratio with all customary organic solvents, but its miscibility with cyclohexane was limited.

From 4-methyl-4-neopentyl-acetidinone-(2)-N-sulfochloride, a lactam of the following constitution was obtained:

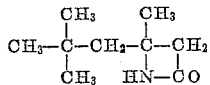

which constituted a colorless liquid similar in consistency to glycerol. The lactam had a boiling point of 107–108° C. under a pressure of 1 mm. of mercury and its solubility in water was limited.

*Example 9*

1,900 grams of 3,4,4-trimethyl-acetidinone-(2)-N-sulfochloride (obtained by reacting trimethylethylene with N-carbonyl-sulfamidic acid chloride) were introduced in portions within 2 hours and at a temperature of 20–30° C., while stirring and cooling, into a solution of 10 grams of potassium iodide in 50 cc. of water, and the mineral acid set free was bound by the gradual addition of a solution of 1,600 grams of caustic potash in 1.5 liters of water. Care was taken that the reaction mixture always exhibited a weakly acid reaction. The reaction mixture formed a well stirrable salt magma which had a light brownish coloration due to a minor amount of free iodine. When the reaction was complete, the salt magma obtained was decolorized by adding, for example, a small amount of bisulfide and finally rendered neutral with the aid of lye. The whole was again stirred, while cooling, with 1 kg. of potash, then suction-filtered and the salt cake was sharply squeezed off. The upper oily layer was separated from the two-phase filtrate, then dried with potash and distilled at a temperature of 74–75° C. under a pressure of 0.5 mm. of mercury. 740 grams of 3,4,4-trimethyl-acetidinone-(2) were obtained as a colorless somewhat thickly liquid. The novel compound so prepared was miscible with the customary organic solvents, water and cyclohexane in any desired ratio, but had only a limited miscibility with olive oil. From its solutions which are not too strongly diluted, it could be salted out with the aid of sodium hydrochloride and with better results with the aid of potash.

The filter cake was after-washed, the aqueous phase was extracted with methylene chloride by shaking, and the whole was again worked up. A further 160 grams of the compound were obtained so that the yield amounted to about 92% of the theoretical.

In analogous manner, the 3-tert. butyl-4,4-acetidinone-(2) was obtained from the lactam-N-sulfochloride having the following constitution

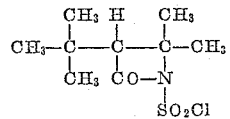

using a mixture of methanol and water as the reaction medium. The compound was obtained in the form of a colorless crystalline product which melted at 76° C. and could readily be sublimed at 70° C. under a pressure of 1 mm. of mercury.

When the lactam sulfochloride obtainable from 2-methylpentene-(1) and $CO_3NClS$ was used and worked up in analogous manner, the β-lactam of the following constitution

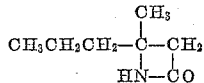

(4-methyl-4-n-propyl-acetidinone-(2)) was obtained in an about 90% yield in the form of a liquid which boiled at 90° C. under a pressure of 0.2 mm. of mercury. The compound had only a limited miscibility with water.

The lactam-sulfochloride obtainable from 2-ethylbutene-(1) and CO₃NClS yielded in analogous manner a β-lactam of the following constitution

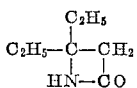

(4,4-diethyl-acetidinone-(2)). The above compound was obtained in the form of a liquid which boiled at 95° C. under a pressure of 0.8 mm. of mercury. The miscibility with water was limited.

*Example 10*

13.5 grams of N-carbonyl-sulfonamidic acid chloride were run at 20° C., while stirring and cooling, into a solution of 25 grams of bis-cyclohexylidene in 120 cc. of ethyl ether. The bulk of the β-lactam-N-sulfochloride obtained which had the following constitution

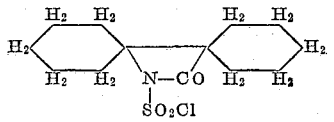

crystallized out. The remainder was obtained by mixing the ether solution with water and evaporating the ether with the aid of a current of air. The yield amounted to 44 grams. By recrystallization from methanol diluted with a little water, a colorless crystalline product which melted at 90°–91° C. was obtained. The compound was soluble in hot methanol, little soluble in cold methanol, and it was substantially stable to water.

In order to be transformed into the free β-lactam, the N-sulfochloride described above was introduced in portions at a temperature of 20–25° C., while stirring and cooling, into 250 cc. of isopropanol, to which a solution of 4 grams of potassium iodide and 2 grams of sodium bisulfite in 10 cc. of water had previously been added. Upon the introduction of the lactam-N-sulfochloride the solution became initially brown as a result of iodine set free. When the brown color had faded after some minutes, a fresh proportion of sulfochloride was again added. The sulfochloride introduced was gradually dissolved and the lactam which had formed separated in crystalline form at the same time. After the last proportion of sulfochloride had been added, the whole was stirred for a further 30 minutes at 25° C. without neutralizing the hydrochloric acid and sulfuric acid formed by means of an acid-binding agent; 250 cc. of water were subsequently added and the whole was filtered with suction. The crude product was recrystallized from 750 cc. of boiling methanol and 24 grams of a colorless crystallizate melting at 221°–222° C. was obtained. The compound constituted the β-lactam having the following constitution

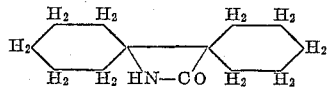

Some further grams of the above compound could be obtained by concentrating the mother liquor.

*Example 11*

522 cc. (6 mols) of N-carbonylsulfamidic acid chloride were run in the course of 1 hour and at a temperature of 30° C., while stirring and cooling, into a mixture of 405 grams of dipentene (3 mols) and 450 cc. of ether, and the whole was stirred for a further hour at 30° C.

The reaction mixture was cooled to 0° C. and 3 liters of methanol which had been pre-cooled to 0° C. were added while stirring. The unsaturated carboxylic acid amide-N-sulfochloride contained in the reaction mixture underwent reaction so that the temperature of the reaction mixture rose to about 15° C., while the bis-β-lactam-N-sulfochloride simultaneously contained in the reaction mixture was separated at the same time in the crystalline state. To complete the separation, the reaction mixture which was maintained at a temperature of 0° C., was stirred for a further hour, then suction-filtered and afterwashed with a small amount of methanol. After drying under reduced pressure, about 390 grams of a mixture of at least two isomeric bis-β-lactam-N-sulfochlorides of the constitution $C_{12}H_{16}O_6N_2S_2Cl_2$, which melted at a temperature of between 105° C. and 120° C. after drying, were obtained.

In order to convert the above sulfochlorides into the free bis-β-lactams, the sulfochloride mixture obtained which was moist with methanol, was introduced in portions and at a temperature of 30°–40° C., while stirring and cooling, into a solution of 30 grams of potassium iodide and about 10 grams of sodium bisulfite in about 50 cc. of water. The hydrochloric acid and sulfuric acid formed during the reaction were bound by adding a total amount of about 400 cc. of sodium hydroxide solution of 30% strength by weight. Care was taken during this procedure that the reaction mixture had always an acid reaction (pH 1 to pH 5). The yellow coloration of the reaction mixture, which was the result of the simultaneous presence of the iodide and the free sulfurous acid, served to indicate a sufficiently high acidity of the solution. The end of the reaction was indicated by the fact that the pH-value which had been adjusted to 5 was not substantially reduced while stirring was continued at 40° C. The reaction mixture was cooled and then allowed to stand for some hours. The whole was suction-filtered and a bis-β-lactam which was scarcely soluble in water was obtained in addition to precipitated sodium sulfate. The filtrate contained a bis-β-lactam which was readily soluble in water and constituted the bulk of the reaction product. The filter residue was recrystallized from 300 cc. of boiling water and about 30 grams of a bis-β-lactam which corresponded to the formula $$C_{12}H_{18}O_2N_2$$

were obtained in the form of well shaped, coarse crystals that melted at 220°–221° C.

The filtrate was mixed with the same volume of a soda carbonate solution saturated in the hot. The readily soluble bis-β-lactam was substantially salted out as upper oily layer which was taken up in methylene chloride. The aqueous mother liquor was repeatedly extracted by shaking with methylene chloride. After the methylene chloride had been removed by distillation, about 150 grams of a sirupy mass which slowly crystallized on standing were obtained. The crude product was dissolved in about the same quantity of methanol or water to yield on prolonged standing a microcrystalline, colorless product of the composition 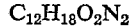 $C_{12}H_{18}O_2N_2$ which melted at a temperature between 160° C. and 180° C. and constituted a mixture of stereoisomeric forms having the following structure.

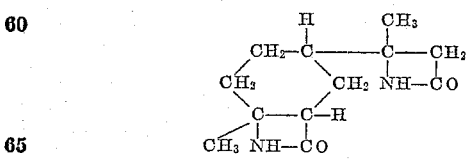

Solutions of both the readily water-soluble and difficultly water-soluble bis-β-lactam in concentrated hydrochloric acid boiled on being heated to about 60°–70° C. with spontaneous increase in temperature and yielded hydrochlorides of diaminodicarboxylic acids.

*Example 12*

250 grams of 4-phenyl-acetidinone-(2)-N-sulfochloride, obtained from styrene and CO₃NClS, were introduced in portions within 30 minutes and at a temperature of about 35° to 45° C., while stirring and cooling, into a mixture prepared from 240 cc. of methanol, 160 cc. of water and 60 grams of iron powder. The air contained in the stirring vessel was previously expelled by means of nitrogen. The respective portion of sulfochloride was introduced only when the reaction, which was accompanied by a spontaneous increase in temperature, had subsided. The reaction mixture was then heated in the course of 15 minutes at about 70° C. and the hot mixture was suctionfiltered to remove the black iron sludge.

The filtrate containing warm ferrous chloride and sulfurous acid was mixed with the same volume of hot water, then allowed to crystallize and cooled. The whole was then suctionfiltered, after-washed with a small amount of water and dried. About 120 grams of 4-phenyl-acetidinone-(2) were obtained in the form of a colorless crystal powder which melted at 107°–108° C. The mother liquor could be extracted by shaking with methylene chloride to yield about a further 15 grams of the above product after evaporation of the solvent. The product could be purified, if desired, by recrystallizing it from dilute methanol.

*Example 13*

250 grams of stannous chloride ($SnCl_2 \cdot 2H_2O$) were introduced in portions within 30 minutes and at a temperature of 20°–25° C., while stirring and cooling, into a mixture prepared from 300 cc. ethanol and 250 grams of 4-phenyl-acetidinone-(2)-N-sulfochloride. When the individual portions of stannous chloride were introduced, this was always accompanied by a spontaneous increase of the reaction temperature. The stannous chloride was transformed into stannic chloride. At the same time, sulfur dioxide was set free and the sulfochloride was dissolved. After the reaction had been terminated, the reaction mixture constituted a homogeneous colorless solution. In order to separate the lactam, the solution was mixed with 1 liter of water and stirred at 0° C. while it was simultaneously cooled with ice. The solution was suction filtered, the crude product, which contained a small amount of meta-stannic acid, was dissolved in 150 cc. of warm methanol, and the meta-stannic acid was removed by filtration; 300 cc. of water were subsequently added and the whole was allowed to crystallize. About 120 grams of 4-phenyl-acetidinone-(2) which melted at 108° C. were obtained. The mother liquor could be extracted by shaking to yield a further 10–15 grams of the above compound.

Under otherwise identical conditions there could be used in the place of stannous chloride compounds of trivalent titanium, such as titanous chloride or its etherates, for example the light blue crystalline double compound with tetrahydrofurane of the composition $TiCl_3 \cdot 3C_4H_{10}O$, which was obtained by reducing titanium tetrachloride, for example, with aluminum diethyl monochloride, to obtain the brown titanous chloride and reacting the latter with tetrahydrofurane.

Instead of stannous chloride there could also be used compounds of bivalent chromium, for example, chromous acetate. Due to the sensitiveness to oxygen of the trivalent titanium compound and bivalent chromium compound, the reaction is advantageously carried out, for example, under nitrogen rather than in the air.

I claim:

1. β-amino-carboxylic acid lactams of the group consisting of

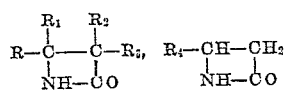

and

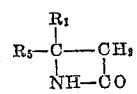

wherein
R is a member of the group consisting of alkyl of up to five carbon atoms and —$CH_2COOCH_3$;
$R_1$ is alkyl of up to five carbon atoms;
$R_2$ and $R_3$ are members of the group consisting of H and alkyl of up to five carbon atoms;
R and $R_1$ together form a six-membered cycloaliphatic ring with the β-carbon atom;
$R_2$ and $R_3$ together form a six-membered cycloaliphatic ring with the α-carbon atom;
$R_4$ is a member of the group consisting of phenyl, β-phenylethenyl, phenyl substituted by an unsubstituted β-lactam ring and phenyl substituted by up to two members of the group consisting of chlorine, bromine, nitro, and methoxy; and
$R_5$ is methyl cyclohexyl substituted by an unsubstituted β-lactam ring.

2. 4,4-dimethyl-acetidinone-(2).
3. 4-methyl-4-n-propyl-acetidinone-(2).
4. 4-methyl-4-neopentyl-acetidinone-(2).
5. 4-phenyl-acetidinone-(2).
6. A process which comprises hydrolyzing, at a pH from 1 to 12 and a temperature of 0° C. to 60° C., a β-lactam-N-sulfochloride of the group consisting of

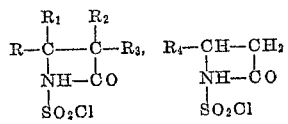

and

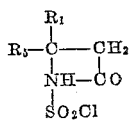

wherein
R is a member of the group consisting of alkyl of up to five carbon atoms and —$CH_2COOCH_3$;
$R_1$ is alkyl of up to five carbon atoms;
$R_2$ and $R_3$ are members of the group consisting of H and alkyl of up to five carbon atoms;
R and $R_1$ together form a six-membered cycloaliphatic ring with the β-carbon atom;
$R_2$ and $R_3$ together form a six-membered cycloaliphatic ring with the α-carbon atom;
$R_4$ is a member of the group consisting of phenyl, β-phenylethenyl, phenyl substituted by a sulfochloride-substituted β-lactam ring and phenyl substituted by up to two members of the group consisting of chlorine, bromine, nitro, and methoxy; and
$R_5$ is methyl cyclohexyl substituted by a sulfochloride-substituted β-lactam ring.

7. A process as claimed in claim 6, wherein alkaline reacting substances are added to the reaction medium to bind the hydrochloric acid and sulfuric acid set free during the reaction.

8. A process as claimed in claim 6, wherein a small amount of alkali-metal iodide is added to the reaction medium as catalytically active agent.

9. A process as claimed in claim 6, wherein the reaction is carried out in water containing a lower aliphatic alcohol as reaction medium.

10. A process as claimed in claim 6, wherein the reaction is carried out in a hydrolyzing mixture obtained from a previous batch and containing water and a β-lactam of the formula given in claim 1 as reaction medium.

11. A process as claimed in claim 6, wherein the reaction is carried out in a mixture of water and containing up to 90% by volume of an inert organic solvent as reaction medium.

12. A process as claimed in claim 6, wherein a buffer salt is added to the reaction medium in a proportion of 0.02 to 0.1 mol per mol of β-lactam sulfochloride.

13. A process as claimed in claim 6, wherein a reducing agent is added to the reaction medium.

References Cited in the file of this patent
FOREIGN PATENTS 941,847    Germany _____ Apr. 19, 1956